(12) United States Patent
Bourgeois, III

(10) Patent No.: US 6,865,739 B1
(45) Date of Patent: Mar. 8, 2005

(54) METHOD FOR IMPLEMENTING POLYINSTANTIATED ACCESS CONTROL IN COMPUTER OPERATING SYSTEMS

(75) Inventor: Fred J. Bourgeois, III, Felton, CA (US)

(73) Assignee: PolySecure Systems, Inc., Aptos, CA (US)

(*) Notice: Subject to any disclaimer, the term of this patent is extended or adjusted under 35 U.S.C. 154(b) by 660 days.

(21) Appl. No.: 09/588,801

(22) Filed: Jun. 6, 2000

(51) Int. Cl.[7] .................................................. G06F 9/00
(52) U.S. Cl. ........................ 718/101; 713/200; 709/225
(58) Field of Search ........................ 718/101; 713/200; 709/225, 222

(56) References Cited

U.S. PATENT DOCUMENTS

| | | | | |
|---|---|---|---|---|
| 5,692,180 A | * | 11/1997 | Lee ............................... | 707/10 |
| 5,845,068 A | * | 12/1998 | Winiger ........................ | 713/200 |
| 5,872,928 A | * | 2/1999 | Lewis et al. ................. | 709/222 |
| 5,889,953 A | * | 3/1999 | Thebaut et al. .............. | 709/221 |
| 6,052,788 A | * | 4/2000 | Wesinger et al. ............ | 713/201 |
| 6,061,723 A | * | 5/2000 | Walker et al. ............... | 709/224 |
| 6,289,462 B1 | * | 9/2001 | McNabb et al. ............. | 713/201 |
| 6,295,605 B1 | * | 9/2001 | Dockter et al. .............. | 713/166 |
| 6,381,627 B1 | * | 4/2002 | Kwan et al. .................. | 709/201 |
| 6,381,639 B1 | * | 4/2002 | Thebaut et al. .............. | 709/222 |
| 2002/0169867 A1 | * | 11/2002 | Mann et al. .................. | 709/224 |

* cited by examiner

*Primary Examiner*—Meng-Al T. An
*Assistant Examiner*—Li Zhen
(74) *Attorney, Agent, or Firm*—Townsend and Townsend and Crew LLP; Kenneth R. Allen

(57) ABSTRACT

A master daemon (a dedicated program component) is provided for a computer operating system which utilizes selected criteria to perform actions in one or more domains, as defined. The master daemon provides application program interfaces (APIs or facilities) and monitors all requests (for which the master daemon is configured) directed to the associated computing base including the operating system. All requests are in the form of encapsulated information as defined. In general, the master daemon, in response to such requests, performs the actions, each constrained to operate exclusively in a single domain. Selected criteria that may be contained in encapsulated information may define a higher-order multidimensional domain space for segregating system operational functionality according to configured boundaries. Multiple instances of actions may exist simultaneously in the same domain in the associated computing base, with the master daemon performing the actions for each request as required in each selected domain. According to a specific embodiment, as prompted by limitations in a purportedly multilevel secure operating system normally directly responsive to autonomous daemons, security is improved through an augmentation applied to the operating system in the form of a master daemon and operative according to a method for controlling access to domains. More specifically, a domain may be configured using constructs of security labels and other criteria.

12 Claims, 7 Drawing Sheets

METHOD FOR IMPLEMENTING POLYINSTANTIATED ACCESS CONTROL IN COMPUTER OPERATING SYSTEMS

BACKGROUND OF THE INVENTION

This invention relates to the field of control of access to services available through computer operating systems. More particularly the invention relates to control of access to services available through multilevel secure systems wherein a multilevel secure operating system implements mandatory access control and maintains security labels.

In the past, computer operating systems have relied on a plurality of gatekeepers, often called "daemons," to monitor all requests and to control access to services. These computer operating systems have thereby allowed decentralization of many management functions and related security functions. While often beneficial, such decentralization can jeopardize system security, integrity, and consistency. Complexity of design and implementation and uncoordinated decentralized management can lead to inconsistency and compromises in security.

These inconsistencies in general computer operating systems are of even greater concern in multilevel secure operating systems. Complexity of design and implementation is greater in these multilevel secure operating systems, and decentralized management of security policies leads to potential compromise of information under protection of these systems. Furthermore, in multilevel secure operating systems, these gatekeepers have provided more than the gatekeeping functions by maintaining session contexts, maintaining user security label information, and allowing access to services available at multiple security labels. In multilevel secure operating systems these implementations are often inefficient, leading to high processing overhead. Thus, in multilevel secure operating systems, distributed access management through multiple autonomous gatekeepers controlling access at multiple security labels is a reason for concern.

SUMMARY OF THE INVENTION

According to the invention, a master daemon (a dedicated program component) is provided for a computer operating system which utilizes selected criteria to perform actions in one or more domains, as defined hereinafter. The master daemon provides application-program interfaces (APIs or facilities) and monitors all requests (for which the master daemon is configured) directed to the associated computing base including the operating system. All requests are in the form of encapsulated information, as defined hereinafter. In general, the master daemon, in response to such requests, performs the actions, each constrained to operate exclusively in a single domain. Selected criteria that may be contained in at least one of the header information, trailer information and payload information may define a higher-order multidimensional domain space for segregating system operational functionality according to configured boundaries. Multiple instances of actions may exist simultaneously in the same domain in the associated computing base, with the master daemon performing the actions for each request as required in each selected domain.

According to a specific embodiment of the invention, as prompted by limitations in a purportedly multilevel secure operating system normally directly responsive to autonomous daemons, security is improved through an augmentation applied to the operating system in the form of a master daemon and operative according to a method for controlling access to domains. More specifically, a domain may be configured using constructs, as defined hereinafter, of security labels and other criteria.

In other embodiments of the invention, the master daemon may utilize criteria other than or in addition to the security label of the request. For example and in particular when used in operating systems that do not provide security labels, the master daemon may utilize one or more criteria, as hereinafter defined, individually or in combinations. To assure maximum integrity, at least one criteria should be in an unmodifiable or unspoofable portion of the request. For purposes of this discussion unmodifiable (and/or unspoofable) suggests that the fields are initialized or maintained by facilities under the control of the computing base and generally not modifiable by user processes. The invention is thus useful for processing a wide variety of requests.

The invention will be better understood by reference to the following detailed description in conjunction with the following drawings.

DESCRIPTION OF SPECIFIC EMBODIMENTS

Figure 1:
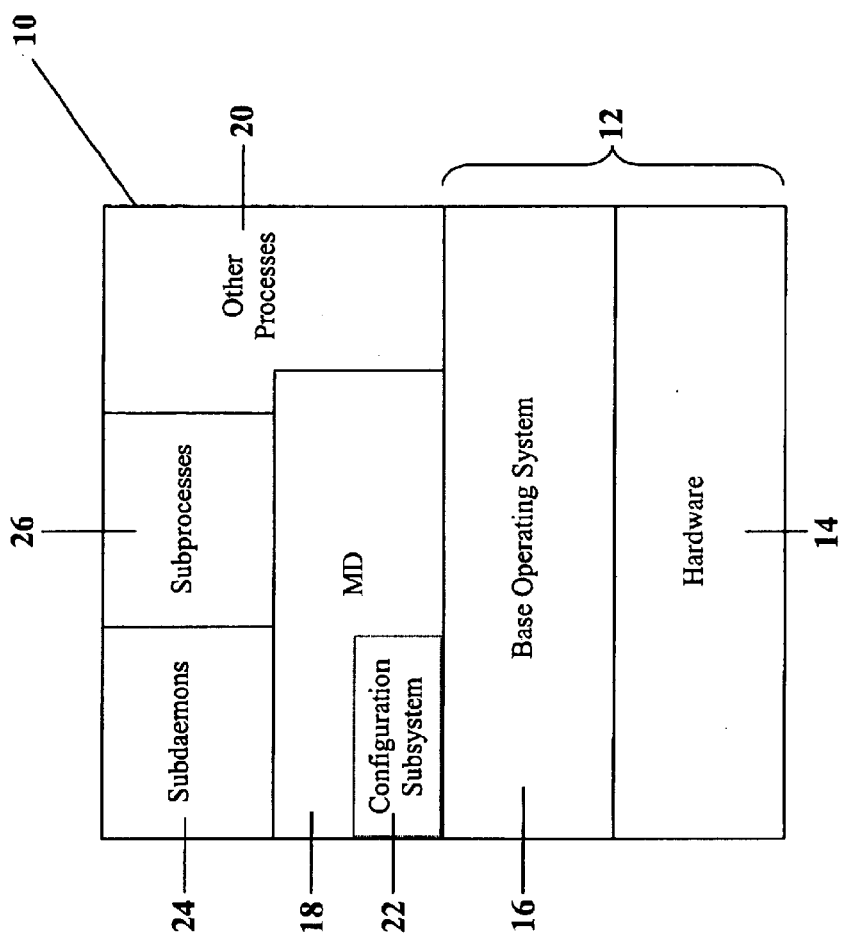
FIG. 1 is a block diagram of elements of a polyinstantiated access control enhanced operating system (PACEOS) according to the invention.

In order to better understand the invention, the following explanation is provided, including a glossary of selected terms.

Glossary of Terms

Action: As used herein, an action is an operation performed on, by, or on behalf of a local or a remote computing base. Examples of actions include but are not limited to operations such as executing an instruction, directly responding to a request, instantiating a process, instantiating a daemon, instantiating a thread, instantiating a task, instantiating a job, submitting a job to a queue, controlling a process, issuing a request, opening a device, closing a device, reading, writing, submitting a document to a printer for printing, initiating a connection or other communication channel, running a program, starting a device, stopping a device, controlling a device, enforcing access controls, selecting criteria.

Application Program Interface (API): An API is a methodology by which an application program interfaces with a system, such as a master daemon, consisting of formalized software calls and routines that can be used to access underlying structures.

Computing base: A computing base is a computer system including both the hardware and operating system software with all required peripheral devices and subsystems. A conventional computing base is a computing base using a conventional operating system. A trusted computing base is a computing base using a multilevel secure operating system. A trusted computing base is therefore an enhancement of a conventional computing base.

Construct: As used herein, a construct is a mathematical concept derived from set theory. Examples of such constructs include but are not limited to various structures that can be arranged for example (1) in a lattice, (2) as a non-contiguous set, (3) as an array, (4) as a range, (5) as a chain, (6) as a semigroup, (7) as a matrix, (8) as a string, (9) as a grammar, (10) as a topology, (11) as a function, (12) as a graph, (13) as a map, (14) as a coordinate system, (15) as a group, (16) by use of any of the aforementioned constructs or mathematical constructs or other mathematical constructs, (17) some combination of these structures, or (18) some combination of these structures on multiple elements. See also criteria, domain, orders of domains.

Criteria (Criterion): As used herein, a single criteria is an identifiable segment of information that can be extracted or derived from encapsulated information. The encapsulated information may be in the form of one or more requests. When so defined, the criteria can be used in a configuration subsystem either individually or in combinations to further define other criteria. See also encapsulated information.

Domain: As used herein, a domain is a space defined by one or more criteria or by one or more sets of criteria. This space is organizationally a set whose members consist of permitted and/or denied actions and permitted and/or denied access. Thus, the universal domain of the zeroth order is that domain which permits any and all actions and access to any and all objects, and the null domain is that domain which denies each and every action and denies access to each and every object. The criteria used to define a domain or domains may be specified in a configuration subsystem. Actions constrained to operate within a domain are implemented by a master daemon acting in a "superdomain." Note that standard set theoretic constructs also apply to domains, e.g., every domain is a subdomain of the universal domain of its order; every domain is a superdomain of itself; every domain is a subdomain of itself; and the null domain is a subdomain of every domain. Additionally, every domain must exist in at least one order of domains. Domains may themselves contain more restrictive subdomains (i.e. "dominated subdomains") defined by additional criteria derived from the initial or succeeding requests, which in turn may contain even more restrictive sub-subdomains, ad infinitum (to the limits defined by the configuration of the master daemon and the operating system). In a multilevel secure operating system, domains may be implemented by use of security labels in combination with zero or more additional criteria. Domains in multilevel secure operating systems need not correspond to a singular security label, but generally consist of sets of criteria, where the criteria include constructs of criteria as defined by the configuration of the master daemon. See also action, construct, criteria, dominate, lattice, null domain, orders of domains, partially ordered set, set, universal domain, zeroth order.

Dominate, Dominance: The concept of dominance is similar to the concept of "greater than or equal to." For example, consider two domains A and B: domain A is said to "dominate" domain B if it incorporates at least all criteria in B. Note that two equal domains A and B each dominate the other. Alternatively, if domain B incorporates criteria not incorporated in domain A, then domain A does not dominate domain B. This does not imply that domain B dominates domain A, since the dominance relation includes the possibility of incomparable criteria. The dominance relation is used to define a partial ordering of criteria, hence the specific meaning of dominance must be specified for each configured type of criteria. See also lattice, null domain, universal domain.

Encapsulated information: As used herein, encapsulated information consists of at least one of header information, trailer information and payload information. Examples of encapsulated information includes but is not limited to packets, cells, frames, other communication structures, files, information in an operating system that implements mandatory access control via the use of security labels on information, security labels, process, objects, messages, domains. See also request.

Inf: An inf is the lowest ranking member of a lattice; also, the member of a lattice that is dominated by all other members of the lattice. Every lattice must have both a sup and an inf. See also lattice, sup.

Lattice: A lattice is a partially ordered set having both an inf and a sup. See also inf, partially ordered set, set, sup.

Null action: A null action is a null operation, that is, an action that results in no action being performed. A null action may also be called an ignoring action. A null action is always one possible valid action. A null action may also be implemented by performing an action in the null domain.

Null domain: A null domain is the domain whose bounds define a region that encompasses no space. The null domain is a subdomain of every domain. See also universal domain.

Orders of domains: Every domain exists within an order, that order of domains being defined by a single set of criteria. By utilizing one or more other separate though possibly overlapping sets of criteria, it is possible to create multiple orders of domains. When multiple orders of domains are thus defined, it is useful to identify each as an Nth order domain, where N corresponds to the set number of the criteria utilized to define each order. Multiple orders can be viewed as a multidimensional system of coordinates, wherein a single domain appears representationally as a point in the potentially hyperspatial coordinate system. For example, in a system employing four orders of domains, a first order (also called highest order) domain might be defined by use of sets of security label criteria, a second order domain by use of sets of user identification criteria, a third order domain by use of sets of networking parameters, and a fourth order domain by use of sets of information-payload-based criteria. Orders can be overlapping or non-overlapping, completely encompassed by higher orders (thereby suborders), or not encompassed by other orders (independent orders). As a special case, every order of domains is a suborder of the zeroth order of domains. The orders of domains form a partially ordered set. See also construct, criteria, domain, partially ordered set, zeroth order.

Partially ordered set (or partly ordered set, or poset): A poset is a set that includes members and defines a partial ordering relation, such as "dominates," on those members. A lattice is a special case of a partially ordered set which has both an inf and a sup. See also, inf, lattice, sup.

Request: As used herein, a request is encapsulated information processed by a computing base. A request must include all of the encapsulated information. See also encapsulated information.

Security label: A security label is a security identifier assigned to an object based on the level at which the object is to be protected. Objects to which security labels may be applied are identifiable elements of a computing base, such as but not limited to information stores, files, disks, devices, computing bases, operating systems, peripheral devices, processes, users, roles, user accounts, data packets, memory locations, input devices, output devices, and control structures. Security labels aid in implementing a layer of functionality known as mandatory access control, which exists in addition to other access control functionality.

Set: A set is a mathematical concept for a prescribed collection of points, numbers, or other objects that satisfy a given condition, or that satisfy specific criteria.

Subdomain: A subdomain is a domain that is completely bounded by another domain. Every domain is a subdomain of itself, every domain is a subdomain of the universal domain of its order, and the null domain is a subdomain of every domain. See also domain, dominate, null domain, set.

Sup: A sup is the highest ranking member of a lattice. Also, the member of a lattice that dominates all other members of the lattice. Every lattice must have both a sup and an inf. See also inf, lattice.

Superdomain: A superdomain is a domain that completely bounds another domain. Every domain is a superdomain of itself, and the universal domain is a superdomain of every domain of its order. See also domain, dominate, set, universal domain.

Universal domain: A universal domain is the domain whose bounds define a region that encompasses all possible domain space in any given order of domains. Every domain is a subdomain (or a dominated domain) of the universal domain of its order. Equivalently, the universal domain is a superdomain (or a dominating domain) of every domain of its order. See also domain, dominate, null domain, orders of domains, set, subdomain, superdomain.

Zeroth order: The zeroth order is the highest order of domains, the order of domains that encompasses all possible universal domains, and dominates all possible sub-orders. See also orders of domains.

FIG. 1 is a block diagram illustrating the elements of a polyinstantiated access control enhanced operating system (PACEOS) 10 according to the invention supporting a plurality of operational domains, the bounds of which are defined by at least one criteria, and possibly bounded to a finer granularity by additional criteria. In the specific case where the conventional computing base 12 is a trusted computing base, the criteria include security labels. The PACEOS 10 comprises a conventional computing base (CCB) 12 including a hardware component 14, its base operating system 16 which may include among other things the functionality of access control, networking, processing and data encapsulation. In a specific case where the base operating system 16 is a multilevel secure operating system, the access control function also implements mandatory access control. The hardware component 14 and the base operating system 16 include for example control functions of central processing units [CPU(s)], peripheral storage, input/output devices, input/output subsystems [I/O subsystem(s)], network device(s) and memory (not shown).

According to the invention, a Master Daemon (MD) 18, controls access to services provided by the PACEOS 10. Other processes 20 may optionally have access to the base operating system 16 without intervention of the MD 18. The MD 18 is configured according to its configuration subsystem 22 to intervene and respond to selected types of requests to the PACEOS 10. The configuration subsystem 22 may have its origin in configuration information which is stored locally, remotely, or centrally. In its operation according to the invention and in response to configured types of requests, the MD 18 performs actions that may include, for example, instantiation of subordinate daemons also called subdaemons 24 for the purpose of carrying out the action or actions. Importantly, according to the invention the subdaemons do not have authorization to control other subdaemons in non-dominated domains. However, a subdaemon may instantiate other subdaemons, granting control and access to the other subdaemons within its limits of authority, or more generically, within the limits of its domain. In this way, subdaemons are used to securely isolate processes of the base operating system 16, whether or not in the context of a multilevel secure operating system. Further in operation according to the invention and in response to designated types of requests, the MD 18 performs actions that may include, for example, instantiation of subordinate processes also called subprocesses 26 for the purpose of carrying out the responses to the requests. Various actions can perform other actions within their domain or more limited subdomains.

Figure 2:
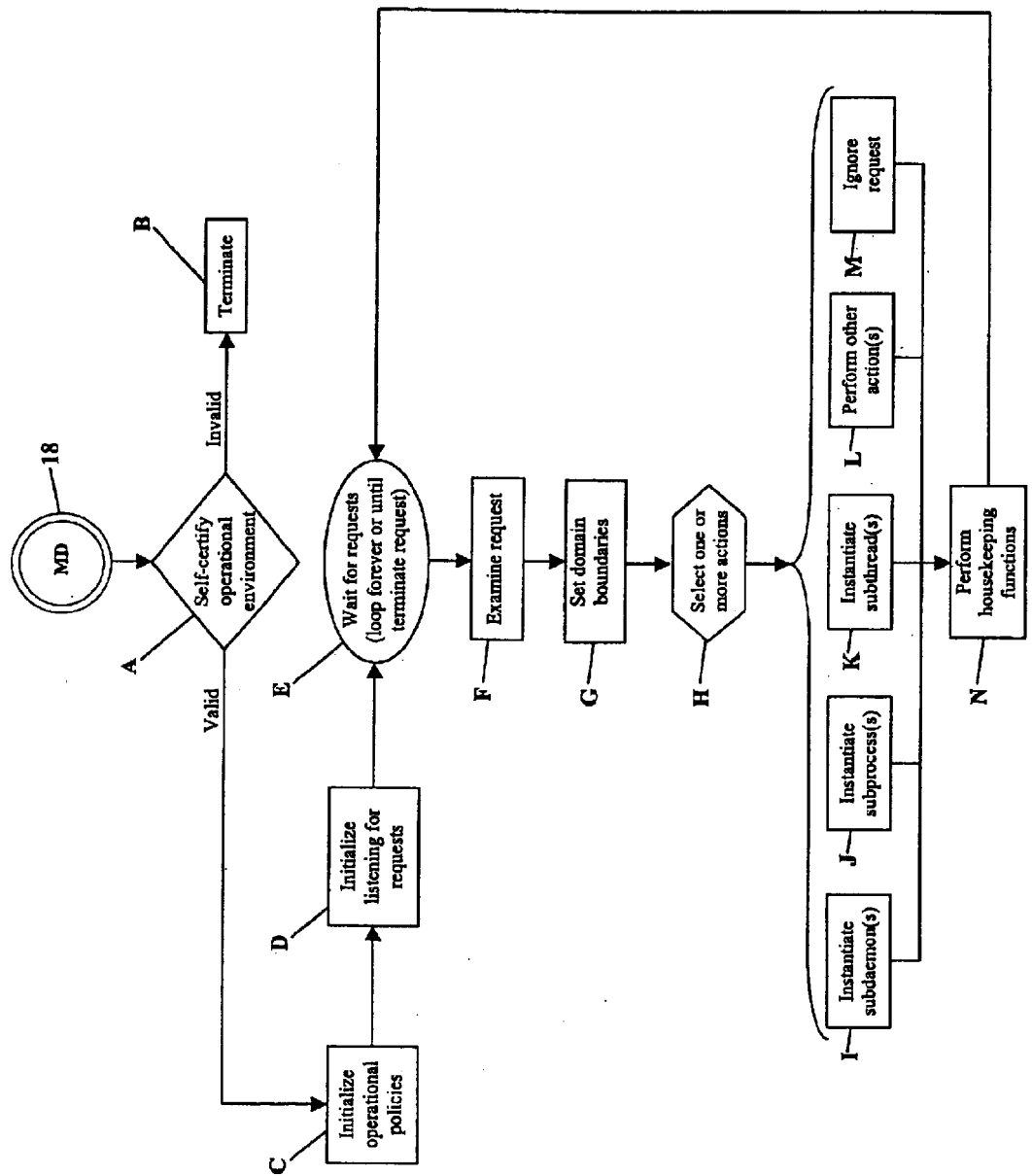
FIG. 2 is a control flow chart illustrating the function of a master daemon according to the invention.

Referring to FIG. 2 the control process that might be implemented by a master daemon or MD 18 is illustrated. First the MD 18 self certifies the operational environment to determine whether the environment is valid (Step A). If the environment is found not to be valid, the MD 18 is terminated (Step B).

If the environment is found to be valid, the MD 18 initializes its operational policies from its configuration subsystem 22 (Step C), then it initializes itself to listen for requests for which it is to monitor and act (Step D), and then it waits for requests (Step E). In response to a request, the MD 18 examines the request (Step F), selects the appropriate domain to be used in the succeeding action or actions (Step G) thereby limiting the action or actions strictly to that domain and its dominated subdomains, and then selects the appropriate action or actions (Step H). An action may be, for example, instantiating one or more subdaemons (Step I), or instantiating one or more subprocesses (Step J), or instantiating one or more lightweight processes (also called subthreads) within the MD 18 (Step K), or performing any other defined action (Step L), or ignoring the request (Step M), or any combination or sequence of these ctions. Then the MD 18 performs housekeeping functions (Step N) including restoring its original domain if necessary, and reverts to waiting for further requests (Step E). Among the control of actions are at least one of the following: auditing, initiation, initialization, instantiation, termination, monitoring, status reporting, interruption, suspension, continuation, prioritization, and possibly others. The MD 18 may provide an appropriate user interface.

In order to better understand the invention, it is helpful to understand the API of a master daemon and actions associated with a master daemon. These interface descriptions make reference to FIGS. 1, 3, 4, 5, 6, and 7.

Master Daemon (MD 18) API

The API for the master daemon (or MD 18) may provide facilities to extend capabilities of the base operating system 16 and to ease implementation of daemons, subdaemons, processes, subprocesses, subthreads, and other actions (hereinafter "subordinates" or "actions"). Precise means of implementing subordinates will vary depending upon the choice of base operating system 16, but the general method for interfacing with any subordinate is the same. In all cases, interface is via the master daemon which accepts the first request 21 for each service for which it has been configured to provide an action. Ignoring a request is also a valid action (i.e. a null action is one possible valid action). The first request 21 is analyzed according to the configured criteria and utilized to select a domain from the multiplicity of higher orders of domains. The master daemon then selects one or more actions in response to the request (and possibly its succeeding requests if part of a series of requests), and constrains all such actions to operate exclusively within the selected domain or within some subdomain that is dominated by the selected domain. If processing the request requires instantiation or performance of a subordinate or subordinates, then upon instantiation or performance of subordinate(s), the MD 18 passes the first request 21 to the subordinate(s). Passing the first request 21 to subordinate(s) may be achieved through any means of data transfer provided by the base operating system 16, including but not limited to command line arguments, environment arguments, environment variables, shared memory structures, files, memory, registers, queues, interprocess communication facilities, file system stores, network interfaces, protocols, streams devices, input/output devices, function calls, procedure calls, messaging, or any other such means as may be available. After successfully transferring the first request 21, the MD 18 returns to listening for new first requests 21, while the subordinate(s) continue handling subsequent requests 42 (if any).

Subordinate Daemon Interface

The subordinate daemon (or subdaemon 31) implements the method specified by the MD 18 for receiving the first request 21 from the MD 18 for daemon-provided services. Subsequent requests 42 are then handled directly by the subdaemon 31. The subdaemon 31 is neither limited nor restricted from handling additional requests that may involve the performance of additional actions that then become a new generation of subordinate(s) to this subdaemon 31. A subdaemon 31 may thus itself be a new master daemon acting in the same or more limited domain than its instantiating master daemon. This relationship is transitive through subordinate actions, meaning that it is possible to create hierarchies of master daemons, each constrained to operate in the same or a more limited domain than its immediate predecessor. This hierarchy can itself be viewed as a poset, with the most venerable master daemon occupying the position of the sup of the poset of master daemons (and possibly other interrelated actions) thereby created.

Subordinate Process Interface

The subordinate process (or subprocess 33) implements the method specified by the MD 18 for receiving the first request 21 from the MD 18 for process-provided services. Subsequent requests 42 are then handled directly by the subprocess 33. The subprocess 33 is neither limited nor restricted from handling additional requests that may involve the performance of additional actions that then become a new generation of subordinate(s) to this subprocess 33. A subprocess 33 may thus itself be a new master daemon acting in the same or a more limited domain than its instantiating master daemon. This relationship is transitive through subordinate actions, meaning that it is possible to create hierarchies of master daemons, each constrained to operate in the same or a more limited domain than its immediate predecessor. This hierarchy can itself be viewed as a poset, with the most venerable master daemon occupying the position of the sup of the poset of master daemons (and possibly other interrelated actions) thereby created.

A subprocess 33 differs from a subdaemon 31 in that the former is typically used to provide one or more special purpose services to a single user, whereas the latter is typically used to provide general purpose services to one or more users according to varying criteria, and also that the latter generally continues to act until administratively terminated. Note that this is a loose definition of these terms, and not a requirement that in any way affects the constraints on either subdaemons 31 or subprocesses 33 as to their ability to perform actions on single or multiple requests for single or multiple users.

Subordinate Thread Interface

The master daemon or MD 18 may instantiate subordinate threads or subthreads 35 to handle certain requests. The choice of using a subthread rather than instantiating a subdaemon 31 or subprocess 33 is guided by availability and efficiency of features of the base operating system 16. For those actions which are implemented by using a subthread 35, the subthread 35 implements the method specified by the MD 18 for receiving the first request 21 from the MD 18 for thread provided services. Subsequent requests 42 are then handled directly by the subthread 35. The subthread 35 is neither limited nor restricted from handling additional requests that may involve the performance of additional actions that then become a new generation of subordinate(s) to this subthread 35. A subthread 35 may thus itself be a new master daemon acting in the same or a more limited domain than its instantiating master daemon. This relationship is transitive through subordinate actions, meaning that it is possible to create hierarchies of master daemons, each constrained to operate in the same or a more limited domain than its immediate predecessor. This hierarchy can itself be viewed as a poset, with the most venerable master daemon occupying the position of the sup of the poset of master daemons (and possibly other interrelated actions) thereby created.

Control API

The master daemon (or MD 18) control API may be implemented internal to the MD 18 so that it does not require external interfaces other than those provided by the base operating system 16. A user interface may enhance the usability of the MD 18 control subsystem, but such user interface is not required.

Figure 3:
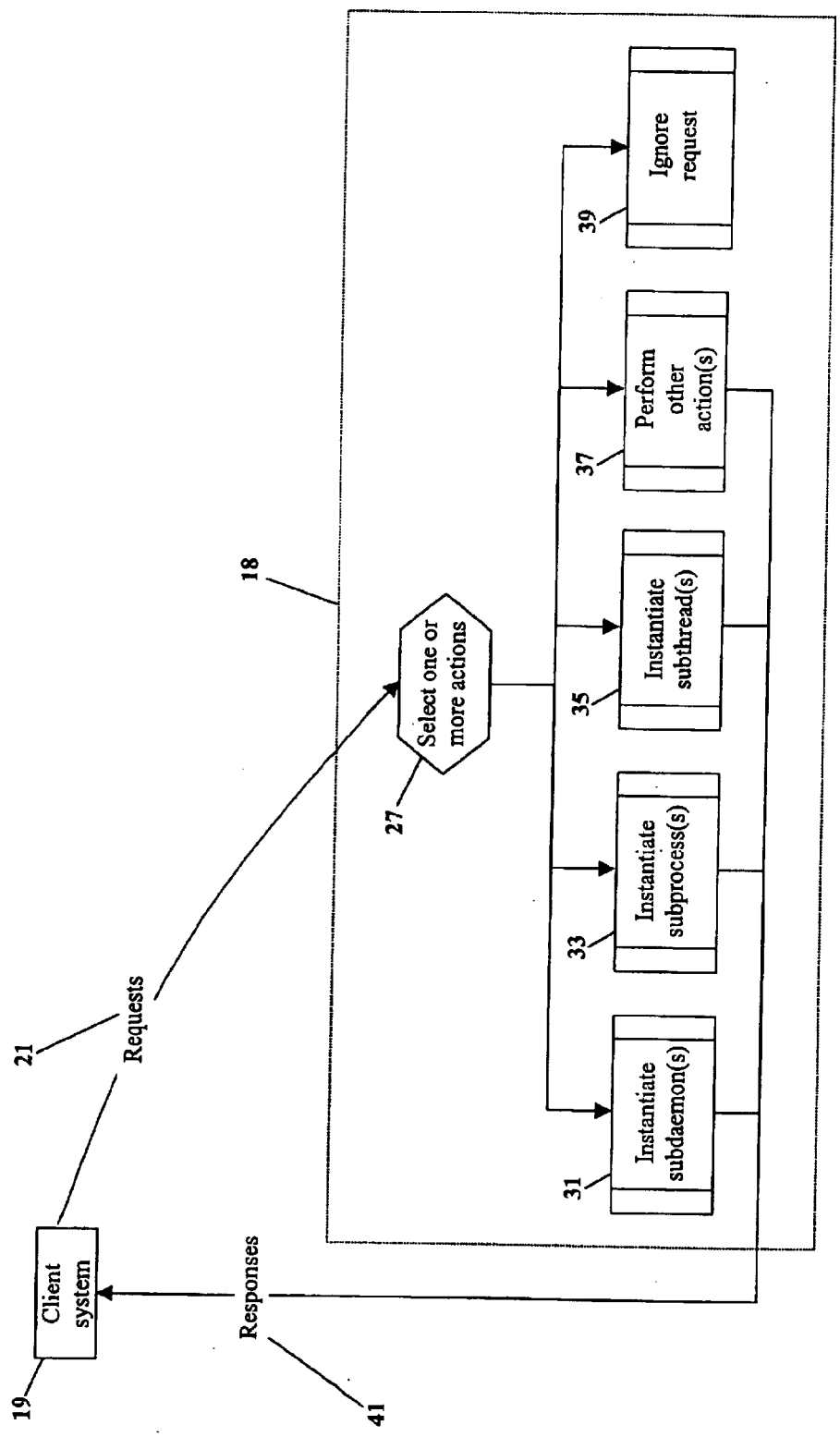
FIG. 3 is a data flow chart illustrating information flow of an initial request in a system according to the invention.

FIG. 3 is a data flow diagram of a system utilizing a master daemon (the MD 18). In the diagram, a client system 19 (which may be operating on the same CCB 12 as the MD 18, or may be operating on a different computing base that has some method of exchanging requests, for example via a network, with the conventional computing base 12 on which the MD 18 is located) transmits a request 21 to the MD 18. A selector 27 chooses one or more of several possible actions (Steps 31, 33, 35, 37), or it may choose to ignore the request 21 (Step 39).

The flow of information depicting the first and subsequent requests with respect to each of the actions is more fully described in succeeding figures. Information flow with respect to instantiating a subdaemon 31 is described in more detail in FIG. 4. Information flow with respect to instantiating a subprocess 33 is described in more detail in FIG. 5. Information flow with respect to instantiating a subthread 35 is described in more detail in FIG. 6. Information flow with respect to performing control actions is described in more detail in FIG. 7, which is one of many possible other actions that may be implemented by the MD 18. Performance of actions other than those shown in FIGS. 4 through 7 is also possible, but not shown in any figure.

Figure 4:
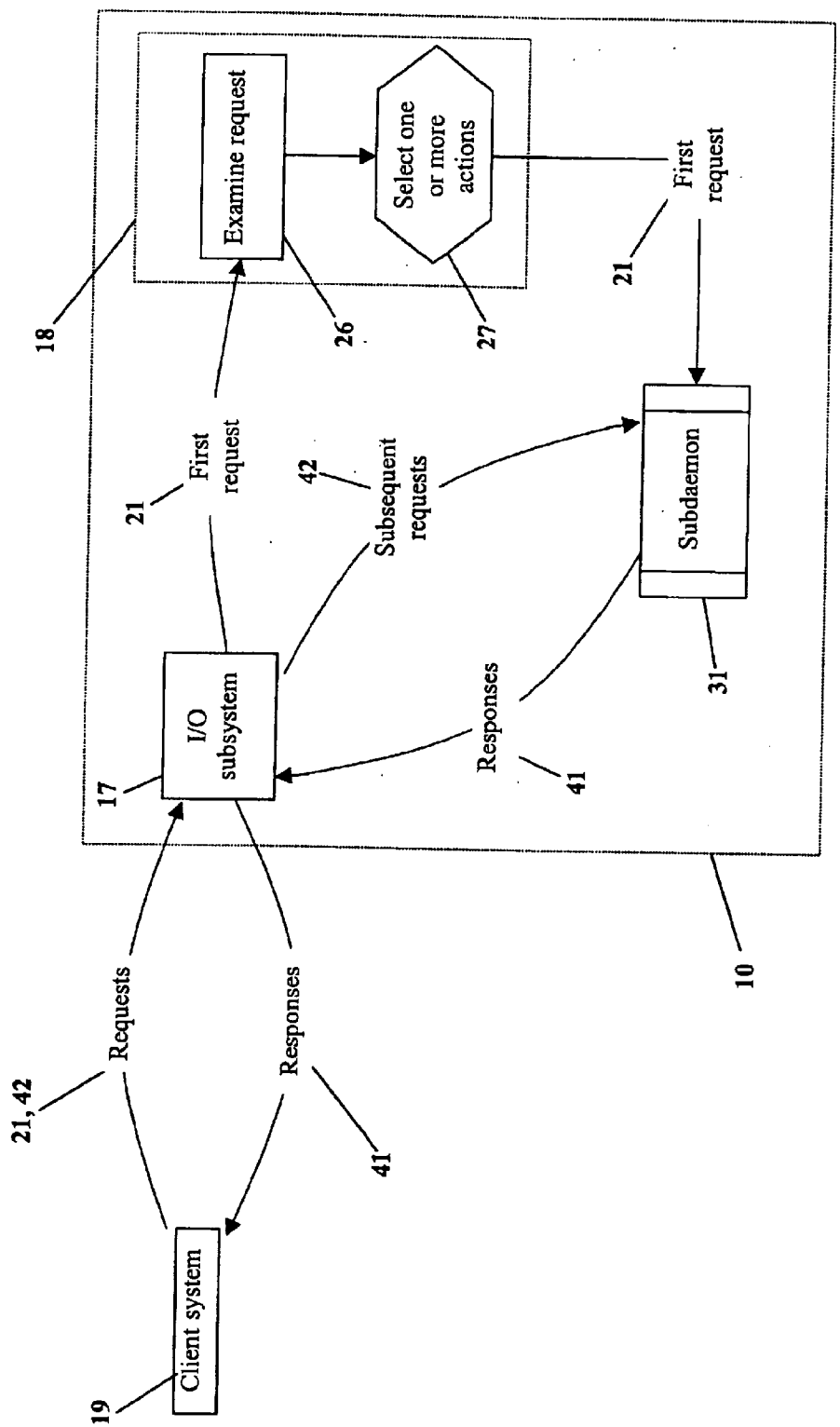
FIG. 4 is a data flow chart illustrating information flow of initial and subsequent requests in a system with respect to instantiating a subdaemon.

In FIG. 4, requests 21, 42 flow from a client 19 to the I/O subsystem 17 of the PACEOS 10. The first request 21 is passed to the MD 18, wherein an element 26 examines the first request 21 preliminary to selection. A selector 27 shows only the selection of instantiating a subdaemon 31, the other potential selections being omitted for purpose of clarity. Subsequent requests 42 are passed directly from the I/O subsystem 17 of the PACEOS 10 to the subdaemon 31. The subdaemon 31 generates responses 41 for the first request 21 and for the subsequent requests 42. These responses 41 flow back out through the I/O subsystem 17 of the PACEOS 10, thence onward as responses 41 to the client 19.

Figure 5:
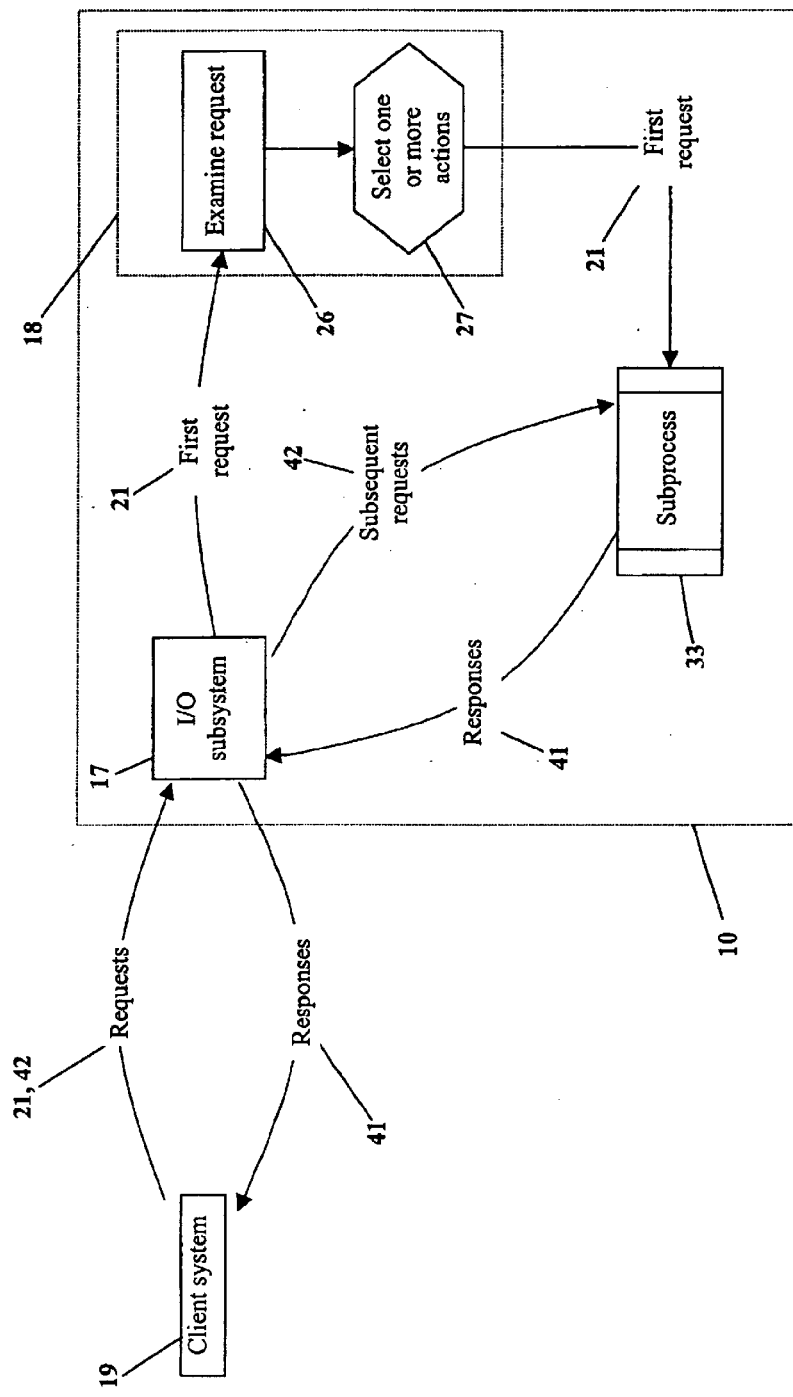
FIG. 5 is a data flow chart illustrating information flow of initial and subsequent requests in a system with respect to instantiating a subprocess.

In FIG. 5, requests 21 flow from a client 19 to the I/O subsystem 17 of the PACEOS 10. The first request 21 is passed to the MD 18, wherein an element 26 examines the first request 21 preliminary to selection. A selector 27 shows only the selection of instantiating a subprocess 33, the other potential selections being omitted for purpose of clarity. Subsequent requests 42 are passed directly from the I/O subsystem 17 of the PACEOS 10 to the subprocess 33. The subprocess 33 generates responses 41 for the first request 21 and for the subsequent requests 42. These responses 41 flow back out through the I/O subsystem 17 of the PACEOS 10, thence onward as responses 41 to the client 19.

Figure 6:
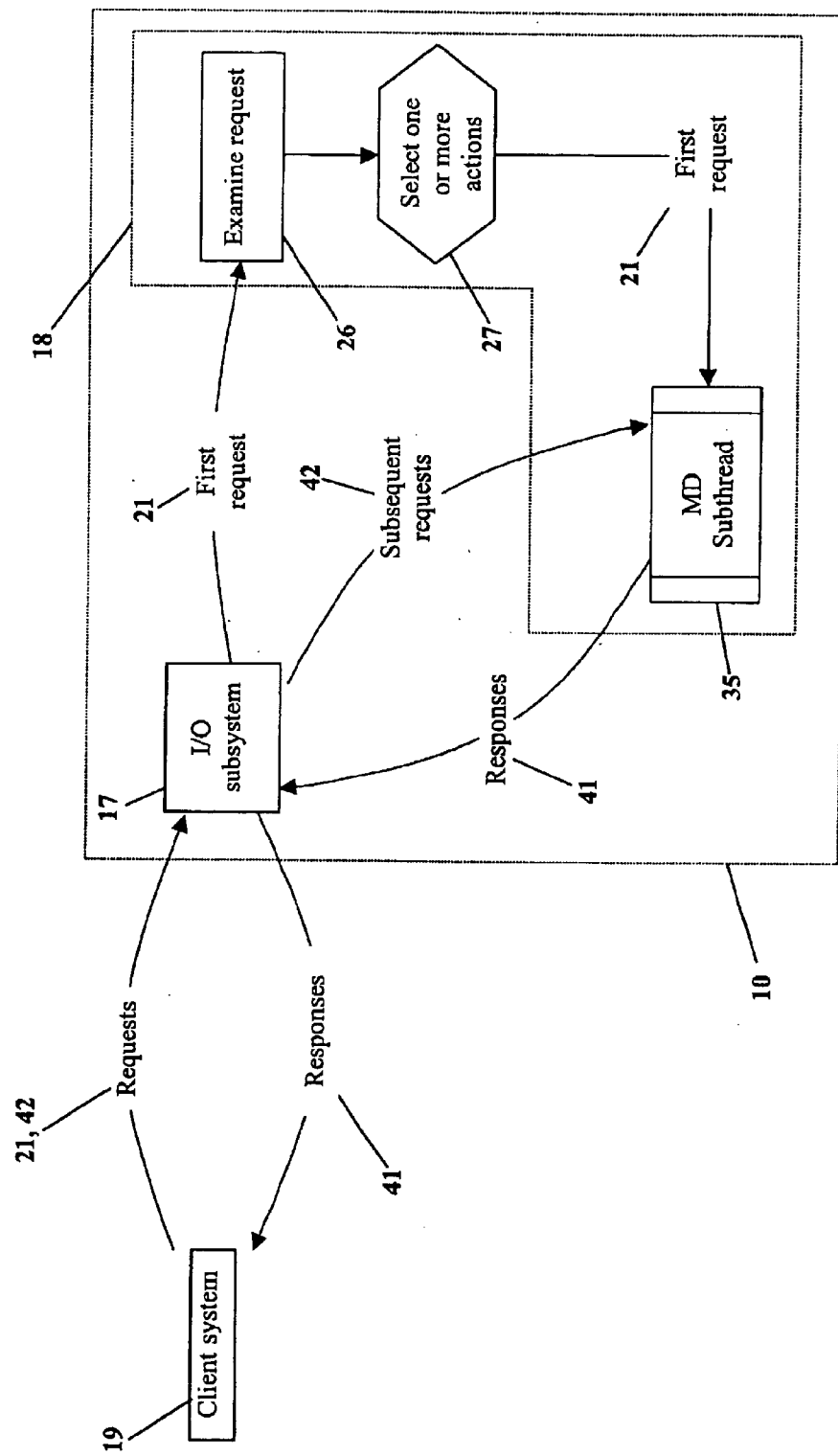
FIG. 6 is a data flow chart illustrating information flow of initial and subsequent requests in a system with respect to instantiating a subthread.

In FIG. 6, requests 21 flow from a client 19 to the I/O subsystem 17 of the PACEOS 10. The first request 21 is passed to the MD 18, wherein an element 26 examines the first request 21 preliminary to selection. A selector 27 shows only the selection of instantiating a subthread 35, the other potential selections being omitted for purpose of clarity. Subsequent requests 42 are passed directly from the I/O subsystem 17 of the PACEOS 10 to the subthread 35. The subthread 35 generates responses 41 for the first request 21 and for the subsequent requests 42. These responses 41 flow back out through the I/O subsystem 17 of the PACEOS 10, thence onward as responses 41 to the client 19.

Figure 7:
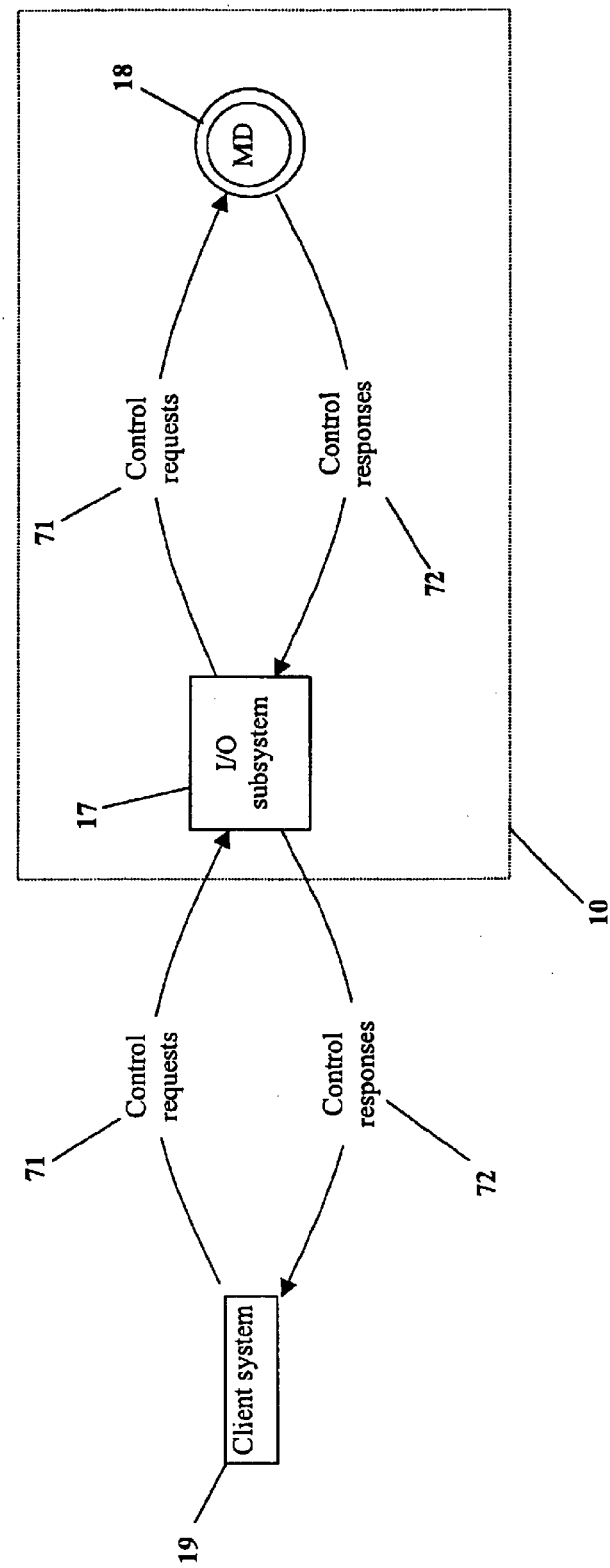
FIG. 7 is a data flow chart illustrating information flow of control requests and control responses.

In FIG. 7, control requests 71 flow from a client 19 to the I/O subsystem 17 of the PACEOS 10 and are passed through to the MD 18. In this figure, the MD 18 processes control requests 71 directly, although this action could alternatively be implemented in the MD control subthread (not shown). For all control requests 71 the MD 18 generates control responses 72 which flow to the I/O subsystem 17 of the PACEOS 10, flowing thence to the client 19. Control responses may incorporate information as to the status of the requested control action.

In each instance, the daemons, subdaemons, processes, subprocesses, subthreads and other actions can perform actions all of which are bounded by the same or more restrictive subdomains than the domain of their instantiator.

While not explicitly shown in the figures, the system is designed to operate on multiple clients and on multiple systems, including actions involved with utilizing a master daemon on one system that performs actions that may be carried out on remote systems, and including performance of both local and remote actions.

In a multilevel secure operating system which enforces mandatory access control, this invention retains existing security mechanisms and enhances the security of applications operating on the multilevel secure operating system.

The invention has been explained with respect to specific embodiments. Other embodiments will be evident to those of ordinary skill in the art. It is therefore not intended that this invention will be limited, except as indicated by the appended claims.

What is claimed is:

1. In an operating system on a computing system wherein requests are in the form of encapsulated information, a method for controlling access to actions and objects within the computing system, said computing system providing facilities for the instantiation of said objects and performance of said actions, said method comprising:

configuring selected domains on said computing system as configured domains, each one of said configured domains comprising a higher-order multidimensional domain space, for segregating system operational functionality according to defined operational boundaries, said operational boundaries defined by mapping attributes of the requests into individual domains;

providing a master daemon, said master daemon selecting said configured domains by utilizing said attributes of the requests; and causing said master daemon to respond to selected ones of said requests to perform at least one of the following actions on said computing system:

instantiating on said operating system at least one subordinate daemon;

instantiating on said operating system at least one subordinate process;

instantiating on said operating system at least one subordinate thread;

performing at least one other defined action;

wherein said subordinate daemons, said subordinate processes, said subordinate threads, and said other defined actions are constrained to operate within one of said configured domains at least as restrictive as the configured domain of said master daemon.

2. The method according to claim 1, wherein said master daemon is further operative to:

control functionality of all said instantiated subordinate daemons, subordinate processes, subordinate threads and said defined actions on said operating system in said computer system.

3. In an operating system on a computing system according to claim 1, wherein said master daemon is further operative to:

interface with said computing system to maintain centralized and coordinated unconditional access to auditing subsystems of said operating system.

4. The method according to claims 1–3 wherein said selected domains are further defined by at least one of a security label, a set of security labels, a lattice of security labels, a group of security labels, a range of security labels, a combination of collections of security labels, and other defined constructs.

5. In an operating system on a computing system connected to a network of computing systems wherein requests are in the form of encapsulated information, a method for controlling access to actions and objects within any of the computing systems, said computing systems providing facilities for the remote instantiation of said objects and performance of said actions, said method comprising:

configuring selected domains on at least one of said computing systems as configured domains, each one of said configured domains comprising a higher-order multidimensional domain space for segregating system operational functionality according to defined operational boundaries, said operational boundaries defined by mapping attributes of the requests into individual operating domains;

providing a master daemon, said master daemon selecting said configured domains by utilizing said attributes of the requests; and causing said master daemon to respond to selected ones of said requests to perform at least one of the following actions on at least one of said computing systems:

instantiating at least one daemon;

instantiating at least one subordinate daemon;

instantiating at least one process;

instantiating at least one subordinate process;

instantiating at least one subordinate thread;

performing at least one other defined action;

wherein said daemons, said subordinate daemons, said processes, said subordinate processes, said subordinate threads, and said other defined actions are constrained to operate within one of said configured domains at least as restrictive as the configured domain of said master daemon.

6. The method according to claim 5 wherein at least one of said computing systems is local to said master daemon.

7. The method according to claim 6 wherein at least one of said computing systems is on said network and is remote from said master daemon.

8. The method according to claim 5 wherein at least one of said computing systems is on said network and is remote from said master daemon.

9. The method according to claim 8 further including the step of:

causing said master daemon to respond to selected ones of said requests to perform a defined action on said remote computing system.

10. The method according to claim 9, wherein said master daemon is further operative to:

control functionality of all said instantiated daemons, subordinate daemons, processes, subordinate processes, subordinate threads and said defined actions on selected ones of said operating systems on computer systems connected to said network.

11. In an operating system on a computing system connected to a network of computing systems according to claim 10, wherein said master daemon is further operative to:

interface with said local computing system and said remote computing systems to maintain centralized and coordinated unconditional access to auditing subsystems of said computing systems connected to said network of computing systems.

12. The method according to claims 5–11 wherein said selected domains are further defined by at least one of a security label, a set of security labels, a lattice of security labels, a group of security labels, a range of security labels, a combination of collections of security labels, and other defined constructs.

* * * * *